No. 719,339. PATENTED JAN. 27, 1903.
T. W. KESTER.
CAR WHEEL AND TRACK THEREFOR.
APPLICATION FILED APR. 3, 1902.
NO MODEL.
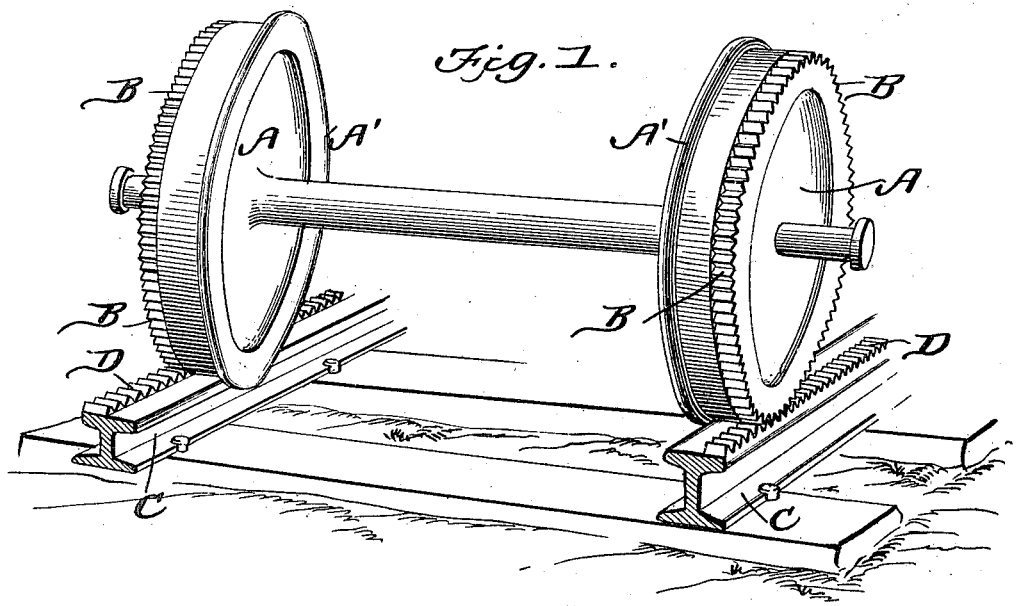
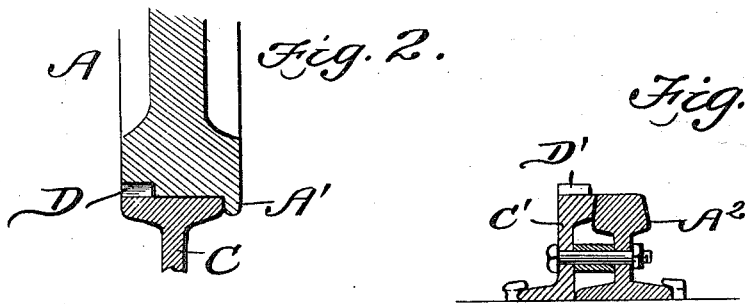
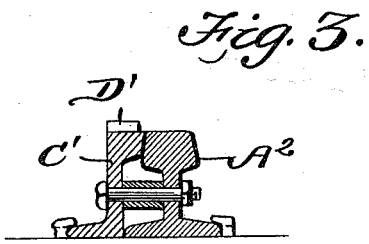
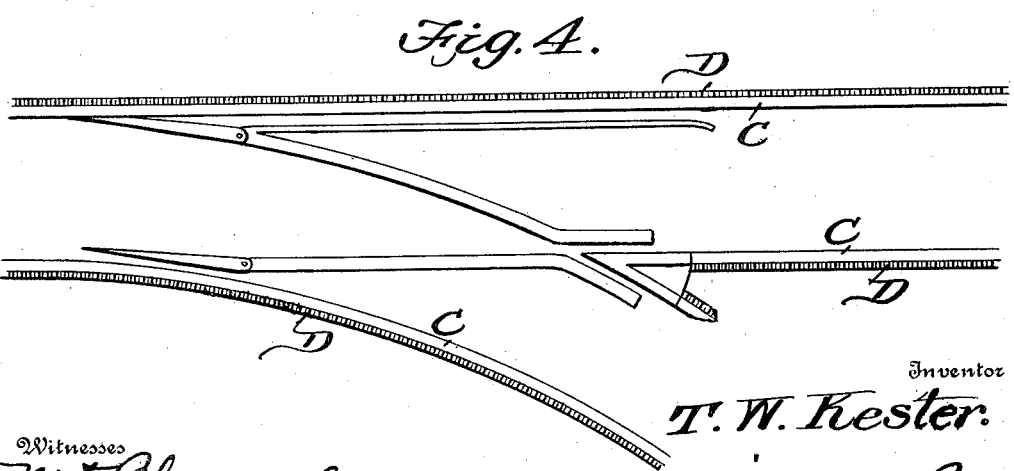
Witnesses
Inventor
T. W. Kester.
Attorneys

UNITED STATES PATENT OFFICE.

THOMAS W. KESTER, OF TREICHLERS, PENNSYLVANIA, ASSIGNOR OF ONE-HALF TO THOMAS A. SNYDER, OF TREICHLERS, PENNSYLVANIA.

CAR-WHEEL AND TRACK THEREFOR.

SPECIFICATION forming part of Letters Patent No. 719,339, dated January 27, 1903.

Application filed April 3, 1902. Serial No. 101,247. (No model.)

*To all whom it may concern:*

Be it known that I, THOMAS W. KESTER, a citizen of the United States, residing at Treichlers, in the county of Northampton and State of Pennsylvania, have invented a new and useful Car-Wheel and Track Therefor, of which the following is a specification.

This invention relates generally to car-wheels and tracks therefor, the object of the invention being to provide a wheel and track particularly adapted for electric railways, said wheel and track being always in positive engagement, thereby avoiding the slipping of the wheel upon the track, and consequently preventing accidents or mishaps upon either the ascent or descent of steep grades.

Another object of the invention is to provide a wheel capable of carrying out these objects and which can be passed freely over switches and frogs without interfering with the said mechanisms.

With these various objects in view the invention consists in the novel features of construction and combination, all of which will be fully described hereinafter and pointed out in the claims.

In the drawings forming part of this specification, Figure 1 is a perspective view illustrating my invention. Fig. 2 is a detail sectional view taken through one wheel and the tread of the rail. Fig. 3 is a detail sectional view showing the slight modification, and Fig. 4 is a diagrammatic view illustrating the manner of arranging the frogs and switches.

Referring to the drawings, A indicates a wheel having the ordinary flange A', the tread of the wheel at the opposite side having teeth or serrations B cut therein. It will thus be noted that the said teeth or serrations do not project beyond the tread or rim of the wheel. The rail C has teeth or serrations D produced upon the tread or head of the rail at one side thereof and in such position that the teeth or serrations B upon the wheel will engage the said teeth or serrations upon the rail. Wherever switches or frogs occur, the teeth or serrations upon the rail are omitted, and inasmuch as the teeth or serrations upon the wheel do not project beyond the tread or rim thereof it is obvious that the said wheels can pass freely over the frogs and switches without interfering therewith.

In Fig. 3 I have shown a slightly-modified form by means of which I am enabled to apply the principles of my invention to the ordinary rails now in use. By referring to Fig. 3 it will be noted I employ a supplemental rail C', securely bolted to the main rail $A^2$, said supplemental rail having teeth or serrations D' produced thereon and in such position that when the wheel is traveling upon the tread of the rail $A^2$ the said teeth or serrations will engage the teeth or serrations of the wheel.

By constructing a wheel and rails in the manner herein set forth it is obvious that all slipping is avoided and a positive engagement between the track and wheels is always had, and the ascent and descent of steep grades can therefore be made much easier than with the smooth rails and wheels now in common use. It will be further understood that by my construction a car may be held on the steepest grade, if the brakes should for any purpose fail to work, by simply reversing the motive power of the car, and also that a car may be held positively against excessive speed or running away should the brakes fail to work, and finally that my device does not in the least interfere with the guard-rails, frogs, or switches or with the guard-rails positioned adjacent the track at curves or upon steep grades.

Having thus fully described my invention, what I claim as new, and desire to secure by Letters Patent, is—

1. The combination with a wheel having teeth or serrations cut in the periphery thereof at the side opposite the flange, of a rail having teeth or serrations projecting above and outside of the tread thereof, substantially as described.

2. The combination with a wheel having teeth or serrations cut in its periphery, the outer edges of said teeth being flush with and outside of the tread of the said wheel, of a rail having teeth or serrations produced upon the upper face of the tread adjacent to the outer side, said teeth or serrations corresponding with the teeth or serrations upon the wheel and adapted for engagement therewith, substantially as specified.

3. The combination with a car-wheel having teeth produced on the outer margin of the periphery of the wheel, the projections of said teeth being flush with the tread of the wheel, and of a rail having a smooth inner and a serrated outer margin, said serrations corresponding with the teeth of the wheel.

4. In a track and wheel, the combination with a series of rails having a smooth inner tread portion and an outer serrated marginal portion, said serrations being omitted from frogs and the inner rails of switches, and a wheel having an inner flange, a smooth tread portion adjacent the flange and a serrated portion on the periphery adjacent the tread and opposite the flange, the said serrated portion being both adapted to engage the serrated portion of the track and to pass over the smooth portion at the frogs and switches.

THOMAS W. KESTER.

Witnesses:
   THOS. A. SNYDER,
   ROBT. P. LENTZ.